United States Patent
Xiaoxian

(10) Patent No.: US 12,127,712 B2
(45) Date of Patent: Oct. 29, 2024

(54) ELECTRIC PEPPER GRINDER

(71) Applicant: Zhuhai Kelitong Electronic Co., Ltd., Zhuhai (CN)

(72) Inventor: Song Xiaoxian, Zhuhai (CN)

(73) Assignee: Zhuhai Kelitong Electronic Co., Ltd., Zhuhai (CN)

( * ) Notice: Subject to any disclaimer, the term of this patent is extended or adjusted under 35 U.S.C. 154(b) by 0 days.

(21) Appl. No.: 17/576,551

(22) Filed: Jan. 14, 2022

(65) Prior Publication Data
US 2023/0065035 A1     Mar. 2, 2023

(51) Int. Cl.
| | |
|---|---|
| *A47J 42/36* | (2006.01) |
| *A47J 42/06* | (2006.01) |
| *A47J 42/38* | (2006.01) |
| *A47J 42/46* | (2006.01) |

(52) U.S. Cl.
CPC ............... *A47J 42/36* (2013.01); *A47J 42/06* (2013.01); *A47J 42/46* (2013.01)

(58) Field of Classification Search
CPC .. A47J 42/06; A47J 42/50; A47J 42/36; A47J 42/38; A47J 42/40
See application file for complete search history.

(56) References Cited

U.S. PATENT DOCUMENTS

| | | | | |
|---|---|---|---|---|
| 3,734,417 A | * | 5/1973 | Russell | A47J 42/38 |
| | | | | 241/168 |
| 2004/0155130 A1 | * | 8/2004 | Wang | A47J 42/44 |
| | | | | 241/169.1 |

FOREIGN PATENT DOCUMENTS

| | | | |
|---|---|---|---|
| CN | 201420342410 | | 11/2014 |
| CN | 201420823650.1 | | 4/2019 |
| CN | 209186447 U | | 8/2019 |
| CN | 212015352 U | * | 11/2020 |

OTHER PUBLICATIONS

English translate (CN212015352U), retrieved date Dec. 2, 2022.*
Gravity Electric Pepper Grinders, retrieved date Dec. 2, 2022. https://www.amazon.com/Gravity-Electric-Grinders-refillable-Rechargeable/dp/B097R1K9QR?th=1.*
Trudeau Plus Pepper Chrome, retrieved date Dec. 3, 2022. https://www.amazon.com/Trudeau-07117021-Pepper-Chrome.*

* cited by examiner

*Primary Examiner* — Mohammed S. Alawadi
(74) *Attorney, Agent, or Firm* — Boyle Fredrickson, S.C.

(57) ABSTRACT

An electric pepper grinder, wherein, on the one hand, a control switch is provided to avoid starting the grinder by mistake when the gravity switch is turned off inadvertently; on the other hand, the storage bin is formed on the shell non-detachably, and it is just necessary to open the bin cover during loading; further, the storage bin is located in the three-segment structure between the grinding and power mechanisms, realizing evener loading.

9 Claims, 3 Drawing Sheets

ELECTRIC PEPPER GRINDER

CROSS-REFERENCE TO RELATED APPLICATION

This application claims priority to Chinese Patent Application 202111008969.X filed on Aug. 31, 2021, the entire contents of which are hereby expressly incorporated by reference into the present application.

TECHNICAL FIELD

The present invention involves an electric pepper grinder, and specifically a small portable electric pepper grinder.

BACKGROUND ART

The electric pepper grinder disclosed in Chinese Patent CN201420342410.X uses a gravity switch to control the startup or shutdown of the grinder only. Although this technology provides a storage bin for containing pepper particles, the gravity switch determines that pepper particles can only be filled into the grinder when the grinder is upright. Therefore, the storage bin in this product should be removed from the main body for loading, and the storage bin should be detached by a large force with both hands, which is inconvenient.

In the electric pepper grinder disclosed in Chinese Patent CN201420823650.1, a storage bin for containing pepper particles is provided on the side wall of the grind, and the power and grinding mechanisms are in the shell. Another disadvantage of this prior art is that the storage bin is provided on the side wall, and the power and grinding mechanisms are in the shell, rendering the grinder unstable. Such grinder is unlikely to be cylindrical, and cannot be held conveniently. In addition, since the storage bin is provided on the side wall, the flow of pepper particles into the grinding mechanism is uneven on the cross section, so that pepper powder so ground is uneven.

What is needed is a pepper grinder that addresses any of the shortcomings of the prior art discussed above.

DESCRIPTION OF THE INVENTION

The present invention uses the following structure to overcome the disadvantages of the prior art.

An electric pepper grinder, comprising a shell, a grinding mechanism, a reducing mechanism and a power mechanism in the shell, wherein a window is opened on the side of the shell, a storage bin is provided in the window, a bin cover that can cover or open the window is provided, the grinding mechanism is at one end of the storage bin, the storage bin is interconnected with the grinding mechanism, the power mechanism and reducing mechanism are at the other end of the storage bin opposite to the grinding mechanism, the power mechanism comprises a power source, a motor, a gravity switch and a control switch, where the control switch controls the connection and disconnection between the gravity switch and the power source. On one hand, this design enables pepper to enter the grinding mechanism rightly and evenly, improving the evenness of grinding; on the other hand, the control switch avoids starting the grinder by mistake when the gravity switch is turned off inadvertently; moreover, a storage bin is formed integrally in the grinder, so that the storage bin does not have to be removed but it is just necessary to open the bin cover when pepper is added, realizing convenient operation, and avoiding storage bin loosening due to repeated removal.

Further, the corresponding control component of the control switch is provided on the outer surface of the shell, which is more convenient for the user to turn on and off the control switch.

Further, a separation wall is provided between the reducing mechanism and the storage bin, and the separation wall, bin cover and shell form a storage bin for containing pepper particles. This design is the specific structure of the storage bin.

The main beneficial technical effects of the present invention are as follows: On one hand, the control switch avoids starting the grinder by mistake when the gravity switch is turned off inadvertently; on the other hand, the storage bin is formed on the shell non-detachably, and it is just necessary to open the bin cover during loading; further, the storage bin is located in the three-segment structure between the grinding and power mechanisms, realizing evener loading; moreover, a storage bin is formed integrally in the grinder, so that the storage bin does not have to be removed but it is just necessary to open the bin cover when pepper is added.

These and other aspects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof. It is hereby disclosed that the invention includes all such modifications.

DESCRIPTION OF THE ATTACHED DRAWINGS

Figure 1:
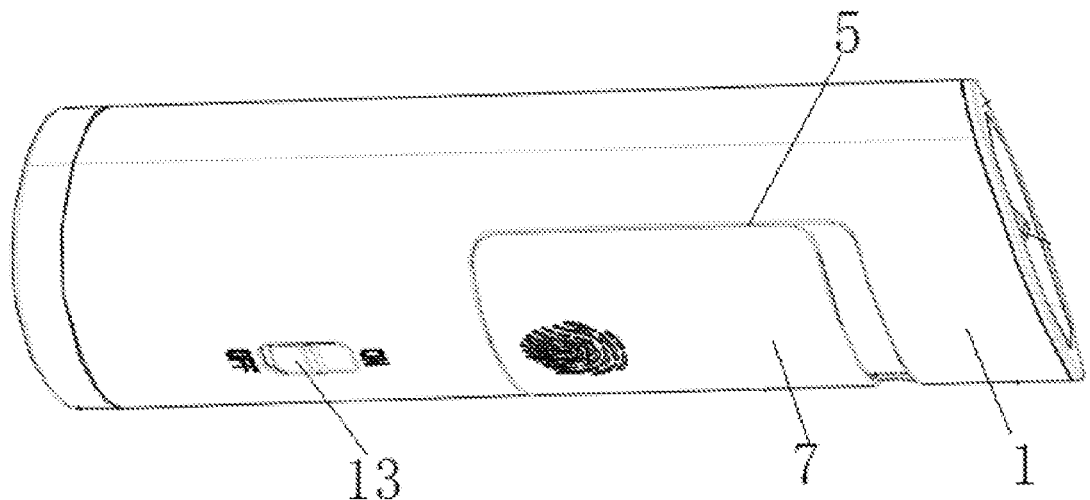
FIG. 1 shows the closed state of the bin cover of the electric pepper grinder of the present invention.

In the drawings: 1) shell; 2) grinding mechanism; 3) reducing mechanism; 4) power mechanism; 5) window; 6) storage bin; 7) bin cover; 8) separation wall; 9) power source; 10) motor; 11) gravity switch; 12) control switch; 13) control component; 14) driving shaft; 15) lower clips; 16) upper clips; 17) alignment point; 18) locating point; 19) main PCB board; 2.1) female grinding head; 2.2) male grinding head; 20) LED lamp; 21) PCB board of LED lamp.

DESCRIPTION OF A PREFERRED EMBODIMENT

To make the purpose, technical solution and beneficial effects of the present application clearer, an embodiment of the present application is described in conjunction with the attached drawings as follows. It should be noted that the embodiments in the present application and the features in the embodiments can be combined freely without conflict.

Figure 2:
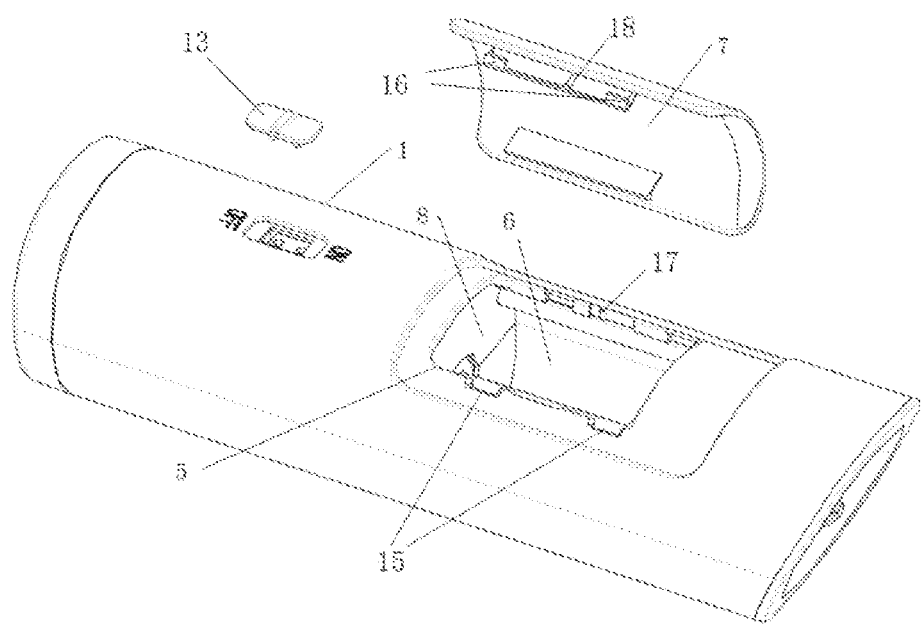
FIG. 2 shows the open state of the bin cover of the electric pepper grinder in the of the present invention.
Figure 3:
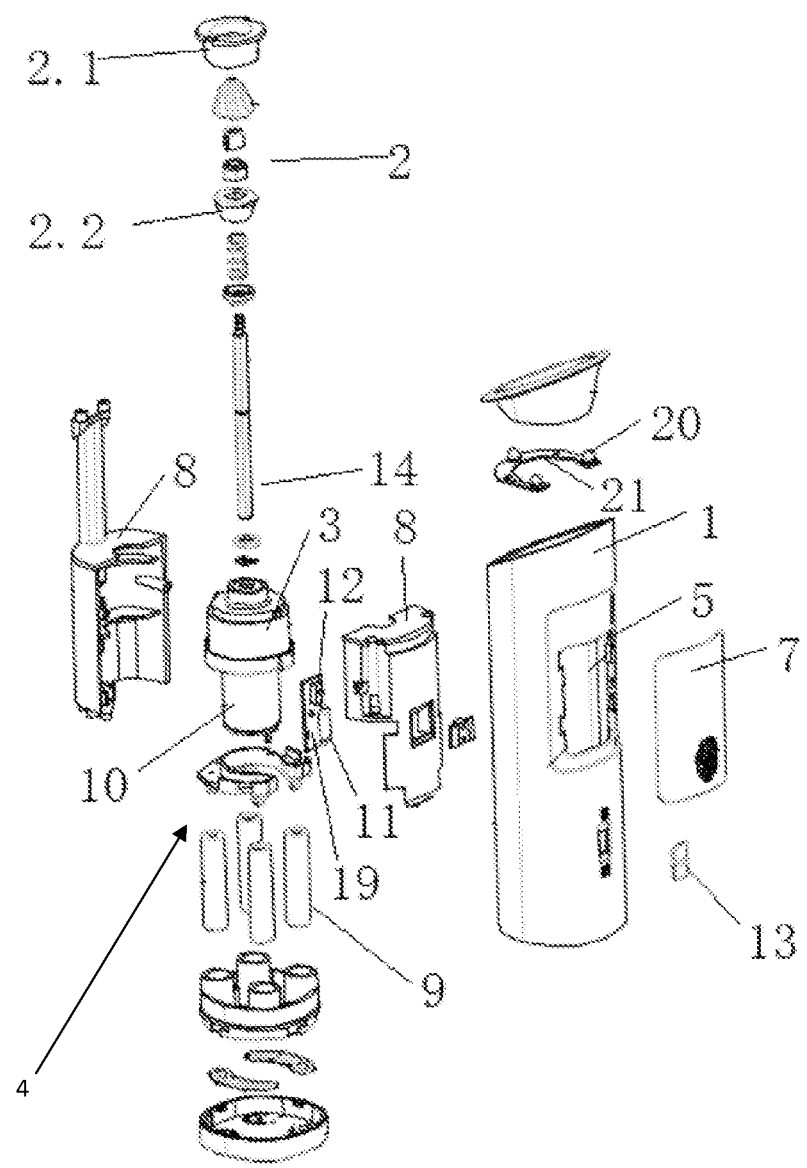
FIG. 3 is an exploded view of the electric pepper grinder in the of the present invention.
Figure 4:
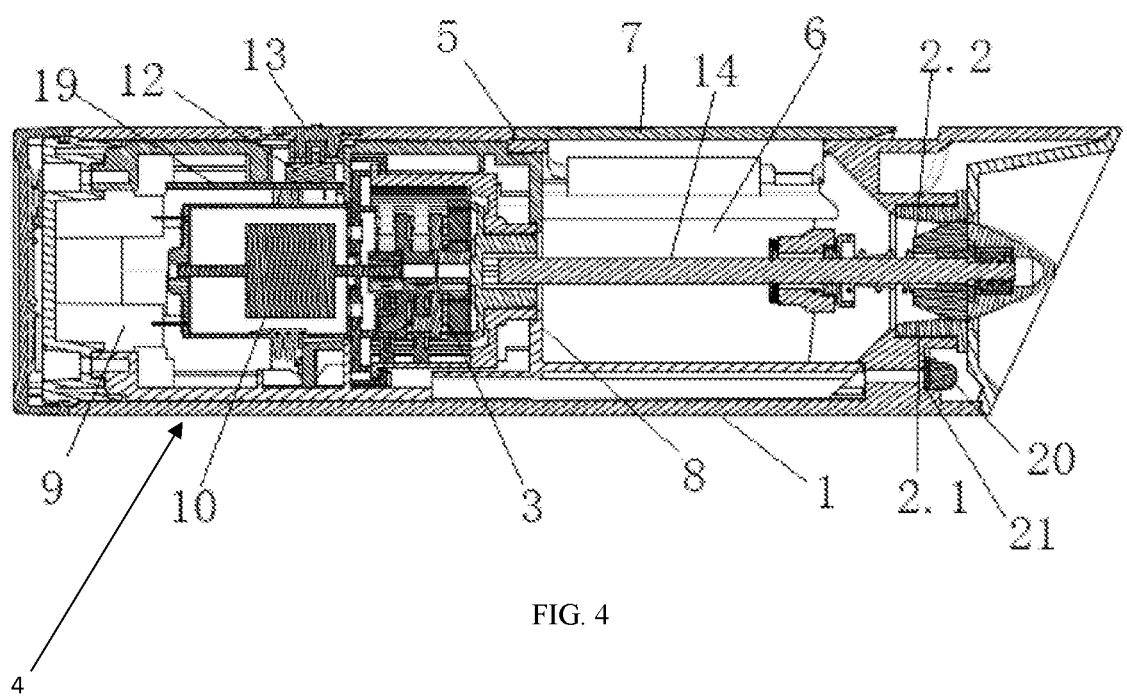
FIG. 4 is a cross sectional view of the electric pepper grinder in the of the present invention.

Referring to FIGS. 1-4, an embodiment is as follows:

An electric pepper grinder, comprising a shell 1, a grinding mechanism 2, a reducing mechanism 3 and a power mechanism 4 in the shell 1, wherein a window 5 is opened on the side of the shell 1, a storage bin 6 is provided in the window 5, a bin cover 7 that can cover or open the window 5 is provided, the grinding mechanism 2 is at one end of the storage bin 6, the storage bin 6 is interconnected with the grinding mechanism 2, the power mechanism 4 and reducing mechanism 3 are at the other end of the storage bin 6 opposite to the grinding mechanism 2, the power mechanism 4 comprises a power source 9, a motor 10, a gravity switch 11 and a control switch 12, the control switch 12 controls the connection and disconnection between the gravity switch 11 and the power source 9. On one hand, this design enables pepper to enter the grinding mechanism rightly and evenly, improving the evenness of grinding; on the other hand, the control switch avoids starting the grinder by mistake when the gravity switch is turned off inadvertently; moreover, a storage bin is formed integrally in the grinder, so that the storage bin does not have to be removed but it is just necessary to open the bin cover when pepper is added.

Further, a control component 13 corresponding to the control switch 12 is provided on the outer surface of the shell 1. This design is convenient for the user to control the control switch externally, realizing low cost.

Further, a separation wall 8 is provided between the reducing mechanism 3 and the storage bin 6, and the separation wall 8, bin cover 7 and shell 1 form a storage bin 6 for containing pepper particles.

Further, it also comprises a driving shaft 14, and the driving shaft 14 is connected to the grinding mechanism 2 after passing through the storage bin 6. This design takes full advantage of the storage bin, and makes the grinder more compact in general.

Further, a detachable or flip connection is between the bin cover 7 and the shell 1. This design is likely to be realized, and makes it convenient for the user to open the bin cover. In addition, the bin cover 7 may also be designed into the flip type.

Further, there are a plurality of lower clips 15 around the window 5, the lower clips 15 match the upper clips 16 on the bin cover 7 so that the bin cover 7 is mounted on the shell 1 in a detachable manner.

Further, an alignment point 17 is provided on the window 5, a locating point 18 is provided on the bin cover 7, and the alignment point 17 matches the locating point 18 when it is connected to the shell 1 in a sliding manner on the shell 1 to restrict the shift of the bin cover 7.

Further, the output terminal of the power source 2 is electrically connected to one end of the control switch 12, the other end of the control switch 12 is electrically connected to one end of the gravity switch 11, and the other end of the gravity switch 11 is electrically connected to the motor 10.

Further, the corresponding control component 13 of the control switch 12 is a key or tactile switch.

Further, the shell 1 is in a shape unlikely to roll, such as a prism, or a plurality of supporting feet are provided on the shell 1. This design is convenient for loading, without fixing the grinder with the other hand to prevent rolling.

The above embodiment is only one embodiment of the present invention, and is described more specifically and in greater detail, but is not intended to restrict the scope of the present invention. It should be noted that for those ordinarily skilled in the art, some transformations and improvements can be made without departing from the conception of the present invention, all of which are within the scope of protection of the present invention. Therefore, the scope of protection of the present invention should be based on the attached claims.

It should also be understood that the components of the system and associated components may be made of any number of different materials and in many different shapes.

Additionally, it should be understood that the various inventive features described above can each be used independently of one another or in combination with other features.

It is appreciated that many changes and modifications could be made to the invention without departing from the spirit thereof. Some of these changes will become apparent from the appended claims. It is intended that all such changes and/or modifications be incorporated in the appending claims.

I claim:

1. An electric pepper grinder comprising:
   a shell having a first end, a second end, and a middle therebetween,
   a grinding mechanism,
   a reducing mechanism and a power mechanism in the shell,
   a window configured to open on a side of the shell,
   a storage bin located in the middle of the shell and provided in the window having a first end and a second end,
   a bin cover configured to be repeatably slidably movable between:
   an open position in which the window is uncovered and the bin cover is removed from the shell, and
   a closed position in which the window is covered cover or open the window,
   a plurality of clips around the window,
   a plurality of clips on the bin cover,
   an alignment point on the window, and
   a locating point on the bin cover;
   wherein the grinding mechanism is at the first end of the storage bin,
   wherein the storage bin is interconnected with the grinding mechanism,
   wherein the power mechanism and reducing mechanism are at the second end of the storage bin,
   wherein the power mechanism further comprises a power source, a motor, a gravity switch and a control switch,
   wherein the control switch controls the connection and disconnection between the gravity switch and the power source,
   wherein the plurality of clips around the window match the plurality of clips on the bin cover so that the bin cover is slidably mounted on the shell in a separably detachable manner, and
   wherein the alignment point matches the locating point when it is connected to the shell in a sliding manner on the shell to restrict a shift of the bin cover.

2. The electric pepper grinder of claim 1, further comprising a control component corresponding to the control switch is provided on the outer surface of the shell.

3. The electric pepper grinder of claim 2, further comprising a separation wall provided between the reducing mechanism and the storage bin, and
   wherein the separation wall, the bin cover, and the shell form the storage bin for containing pepper particles.

4. The electric pepper grinder of claim 3, further comprising a driving shaft,
   wherein the driving shaft is connected to the grinding mechanism after passing through the storage bin.

5. The electric pepper grinder of claim 4, further comprising a detachable or flip connection between the bin cover and the shell.

6. The electric pepper grinder of claim 1, wherein the output terminal of the power source is electrically connected to one end of the control switch,
   wherein the other end of the control switch is electrically connected to one end of the gravity switch, and
   wherein the other end of the gravity switch is electrically connected to the motor.

7. The electric pepper grinder of claim 6, wherein the corresponding control component of the control switch is a key or tactile switch.

8. The electric pepper grinder of claim 7, wherein the shell is in a shape unlikely to roll.

9. An electric pepper grinder comprising:
   a shell having a first end, a second end, and a middle therebetween,
   a grinding mechanism,
   a reducing mechanism and a power mechanism in the shell,
   a window configured to open on a side of the shell,
   a storage bin located in the middle of the shell and provided in the window having a first end and a second end,
   a bin cover configured to be repeatably slidably movable about a gap located between the bin cover and an end of the window between:
   an open detached position in which the window is uncovered, and
   a closed position in which the window is covered cover or open the window,
   a plurality of clips around the window,
   a plurality of clips on the bin cover,
   an alignment point on the window, and
   a locating point on the bin cover;
   wherein the grinding mechanism is at the first end of the storage bin,
   wherein the storage bin is interconnected with the grinding mechanism,
   wherein the power mechanism and reducing mechanism are at the second end of the storage bin,
   wherein the power mechanism further comprises a power source, and a motor,
   wherein a control switch controls the connection and disconnection of the power source,
   wherein the plurality of clips around the window match the plurality of clips on the bin cover so that the bin cover is slidably mounted on the shell in a detachable manner, and
   wherein the alignment point matches the locating point when it is connected to the shell in a sliding manner on the shell to restrict a shift of the bin cover.

* * * * *